(12) United States Patent
Koizumi

(10) Patent No.: US 8,904,502 B1
(45) Date of Patent: Dec. 2, 2014

(54) SYSTEMS AND METHODS FOR RATING ORGANIZATIONS USING USER DEFINED PASSWORD GATES

(76) Inventor: Niels T. Koizumi, Brooklyn, NY (US)

(*) Notice: Subject to any disclaimer, the term of this patent is extended or adjusted under 35 U.S.C. 154(b) by 0 days.

(21) Appl. No.: 13/439,398

(22) Filed: Apr. 4, 2012

Related U.S. Application Data

(60) Provisional application No. 61/471,485, filed on Apr. 4, 2011.

(51) Int. Cl.
 *G06F 7/04* (2006.01)
 *G06F 21/31* (2013.01)
 *G06F 15/16* (2006.01)

(52) U.S. Cl.
 CPC .................................. *G06F 21/31* (2013.01)
 USPC ............. 726/6; 726/2; 726/4; 726/7; 713/182

(58) Field of Classification Search
 CPC .................................. G06F 21/31; G06F 21/46
 USPC ............................................................. 726/6
 See application file for complete search history.

(56) References Cited

U.S. PATENT DOCUMENTS

| | | | |
|---|---|---|---|
| 6,901,394 B2 * | 5/2005 | Chauhan et al. ................. 706/60 |
| 6,938,068 B1 * | 8/2005 | Kraft et al. .................... 709/203 |
| 8,548,818 B2 * | 10/2013 | Wagner et al. ................. 705/1.1 |
| 2001/0034015 A1 | 10/2001 | Raichur et al. |
| 2005/0060283 A1 | 3/2005 | Petras et al. |
| 2005/0187929 A1 * | 8/2005 | Staggs ............................. 707/4 |
| 2006/0106788 A1 * | 5/2006 | Forrest ............................. 707/4 |
| 2006/0287907 A1 * | 12/2006 | Kim ................................ 705/10 |
| 2007/0055694 A1 * | 3/2007 | Ruge et al. .................. 707/104.1 |
| 2007/0219886 A1 * | 9/2007 | Cooke ............................. 705/35 |
| 2008/0098464 A1 | 4/2008 | Mizrah |
| 2008/0160490 A1 * | 7/2008 | Gomes et al. ................. 434/350 |
| 2009/0177649 A1 | 7/2009 | Hsieh |
| 2009/0292722 A1 | 11/2009 | Ayloo |
| 2010/0057539 A1 * | 3/2010 | Allen ............................... 705/10 |
| 2010/0064365 A1 * | 3/2010 | Kanduri et al. ................. 726/21 |
| 2010/0070554 A1 | 3/2010 | Richardson et al. |

(Continued)

FOREIGN PATENT DOCUMENTS

| | | | | |
|---|---|---|---|---|
| GB | 2367914 A * | 4/2002 | ............. G06F 17/30 |
| WO | 2004090776 A1 | 10/2004 | |

OTHER PUBLICATIONS

Maybury, Mark T., Expert Finding System, Mitre, Center for Integrated Intelligence Systems, Bedford, Massachusetts, Sep. 2006, pp. 27-28 of PDF and pp. 19-20 of PDF.

*Primary Examiner* — Ashok Patel
*Assistant Examiner* — Gary Gracia
(74) *Attorney, Agent, or Firm* — Amster, Rothstein & Ebenstein LLP

(57) ABSTRACT

A system and method for implementing password gates for entities and/or content is disclosed. A password gate may determine whether a select group of users are allowed to access a particular entity and/or content in order to rate and/or provide commentary with respect to that particular entity/content. The select group of users may be permitted access based on the ability to satisfy the password gate. A password gate may comprise a question that only a select group of users can correctly answer. Users may be able to create password gates and/or vote on existing password gates associated with entities and/or content. The highest rated password gate may be presented to a user attempting to gain access to a particular entity/content.

14 Claims, 9 Drawing Sheets

(56) References Cited

U.S. PATENT DOCUMENTS

| | | | |
|---|---|---|---|
| 2010/0076998 A1* | 3/2010 | Podgorny et al. | 707/772 |
| 2010/0114776 A1 | 5/2010 | Weller et al. | |
| 2010/0132043 A1* | 5/2010 | Bjorn et al. | 726/25 |
| 2010/0191686 A1* | 7/2010 | Wang et al. | 706/46 |
| 2010/0198834 A1 | 8/2010 | Petras et al. | |
| 2010/0325014 A1* | 12/2010 | Widjojo et al. | 705/26.35 |
| 2011/0029895 A1* | 2/2011 | Ternouth | 715/753 |
| 2011/0067094 A1* | 3/2011 | Antell et al. | 726/7 |
| 2011/0125783 A1* | 5/2011 | Whale et al. | 707/769 |
| 2011/0154498 A1* | 6/2011 | Fissel et al. | 726/25 |
| 2011/0212430 A1* | 9/2011 | Smithmier et al. | 434/322 |
| 2011/0275047 A1* | 11/2011 | Gomes et al. | 434/350 |
| 2011/0302216 A1* | 12/2011 | D'Angelo et al. | 707/802 |
| 2012/0023136 A1* | 1/2012 | Kuo et al. | 707/780 |
| 2012/0159590 A1* | 6/2012 | Novack et al. | 726/7 |
| 2012/0167007 A1* | 6/2012 | Ross et al. | 715/811 |
| 2012/0246575 A1* | 9/2012 | Baldwin et al. | 715/751 |
| 2013/0007037 A1* | 1/2013 | Azzam et al. | 707/769 |

\* cited by examiner

Create an Insider Password Gate for:

"ABC Restaurant"

Enter Insider Password Question (IPQ):

What does chef Dan like to drink while cooking?

Enter Insider Password Answer (IPA):
(Single word only with no spaces or characters)

Rootbeer

Submit

FIG. 2A

Rate Insider Password Questions for:
"ABC Restaurant"

Current Rank:  (Select +/- for each)

1) What does chef Dan like to drink while cooking? ☐ +  — ☐

2) What was the restaurant called before it was ABC? ☐ +  — ☐

3) Where did Margaret go on vacation? ☐ +  — ☐

4) What's the name of the owner's dog? ☐ +  — ☐

5) What color are my blue suede shoes? ☐ +  — ☐

[Submit Votes]

FIG. 3A

| Password Question | Prior Rating | Prior Ranking | Current Rating | Current Ranking |
|---|---|---|---|---|
| What does chef Dan like to drink while cooking? | +15/-5 | 1 | +12/-5 | 2 |
| What was the restaurant called before it was ABC? | +14/-5 | 2 | +13/-4 | 1 |
| Where did Margaret go on vacation? | +4/-2 | 3 | +4/-2 | 3 |
| What's the name of the owner's dog? | +4/-3 | 4 | +3/-3 | 4 |
| What color are my blue suede shoes? | +1/-2 | 5 | +1/-1 | 5 |

FIG. 5A

SYSTEMS AND METHODS FOR RATING ORGANIZATIONS USING USER DEFINED PASSWORD GATES

RELATED APPLICATIONS

This applications relates to and claims priority to U.S. Provisional Patent Application No. 61/471,485, filed Apr. 4, 2011, the contents of which are incorporated by reference herein in its entirety.

FIELD

The present disclosure generally relates to systems and methods for allowing particular users of a website to define password gates.

SUMMARY

In exemplary embodiments, the present disclosure generally relates to systems and methods for using password gates for providing access to electronic content. In exemplary embodiments, one or more electronic databases stored on one or more computer-readable storage media operatively connected to one or more computers may be accessed, with the databases including (i) entity information identifying one or more entities, (ii) password gate information associated with at least one of the entities, including one or more password gates, (iii) user information associated with one or more users, (iv) rating information including ratings for one or more password gates for respective entities. In exemplary embodiments, the one or more computers may receive a request to access a first entity from a client device. The one or more computers may access entity information associated with the first entity, password gate information associated with the first entity, and password gate rating information associated with the one or more password gates for the first entity, and the one or more computers may select a password gate based in part on the password gate rating information. In exemplary embodiments, the password gate may be transmitted to the client device, and the one or more computers may receive from the client device answer information associated with the transmitted password gate. The one or more computers may determine whether the answer information answers the password gate and may provide a ratings interface to the client device for rating the first entity if the answer information answers the password gate.

In exemplary embodiments, the one or more computers may assign a status to the user of the client device based on whether the answer information provided by the client device answers the password gate. The one or more computers may store the assigned status in the one or more databases as part of the user information. In some exemplary embodiments, the one or computers may assign an insider status if the answer information answers the password gate.

In some exemplary embodiments, the one or more computers may assign an outsider status if the answer information does not answer the password gate, and provide such user access to a second or different ratings interface.

In some exemplary embodiments, a selected password gate may include one question. In some embodiments, the password gate may include a plurality of questions. In exemplary embodiments, answers to password gate questions may be a single word.

In exemplary embodiments the password gate rating information associated with an entity may include information indicating a total number of plus votes and a total number of minus votes. In some exemplary embodiments, the one or more computers may select and transmit to a client device a password gate with the highest total number of plus votes relative to total number of minus votes.

In some exemplary embodiments, the one or more computers, after providing access to an interface, may receive rating information for password gates associated with the first entity from a client device, and update the one or more databases with such received information.

In some exemplary embodiments, the one or more computers, after providing access to an interface, may receive a proposed password gate from a client device. The one or more computers may assign an initial rating to the password gate on behalf of the user of the client device and update the one or more databases based on the proposed password gate and assigned rating.

In some exemplary embodiments, the one or more computers, after providing access to an interface, may receiving rating information associated with the first entity, and may update the one or more databases with the received rating information. The updated rating information for the first entity, may be published to one or more destinations, such as a web site.

In exemplary embodiments, one or more electronic databases stored on one or more computer-readable storage media operatively connected to one or more computers may be accessed with the databases including (i) entity information identifying one or more entities, (ii) password gate information associated with at least one of the entities, including one or more password gates, (iii) user information associated with one or more users, (iv) rating information including ratings for one or more password gates for respective entities. In exemplary embodiments, the one or more computers may receive a request from a client device to rate one or more password gates associated with first entity. The one or more computers may access entity information associated with the first entity, password gate information associated with the first entity, and password gate rating information associated with the one or more password gates for the first entity and may provide a password gate rating interface that may display the one or more password gate questions for the first entity. The one or more computers may receive password gate rating information for the one password gate information via the interface, and update the one or more databases based on the received password gate rating information.

DESCRIPTION OF THE DRAWINGS

The features and advantages of the present disclosure will be more fully understood with reference to the following, detailed description when taken in conjunction with the accompanying figure, wherein:

FIG. 2A is an exemplary interface for creating password gates using a ratings access system according to an exemplary embodiment of the present disclosure.

FIG. 3A is an exemplary interface for rating password gates using a ratings access system according to an exemplary embodiment of the present disclosure.

FIG. 5A is an exemplary representation of rankings for password gates of a ratings access system according to an exemplary embodiment of the present disclosure.

DETAILED DESCRIPTION

The disclosure generally relates to systems and methods for allowing one or more users of a system to create password gates for a particular entity, particular content, or an individual section of content for a particular entity. In exemplary embodiments, a password gate may include a question for a particular entity/content, where a correct answer provides a user access. In exemplary embodiments, the website could be a ratings website, such as a restaurant rating website. In exemplary embodiments, users can vote for or against, and/or vote positively or negatively, for allowing or identifying a popular or most popular question and answer password gate to stand as an active gate for that particular section of content or for the particular entity. In exemplary embodiments, a select group of users can be identified based on their ability to answer a top-rated password gate. A password gate can include a single-sentence question and an undisclosed single-word answer, but is not limited to such. For example, more than one question can be provided, and answers can be typed in, or a multiple choice listing can be provided, and/or any other form of question and answers can be used, and hints may or may not be provided. In exemplary embodiments, users who can correctly answer an active password gate can be permitted to voice opinions, write comments, rate different specific sections of particular content, and can affect content that a particular password gate is applied to or associated with. In exemplary embodiments, password gates can be created for one or more sections of content so that particular users can be identified for each section of content. In exemplary embodiments, all users can propose new password gates and/or help select active password gates by rating individual password gate(s) submitted for different areas of content. It can be monitored and/or recorded whether the rating(s) and/or new password gate(s) were proposed/submitted by a person who answered the answer gate correctly or not.

Figure 1:
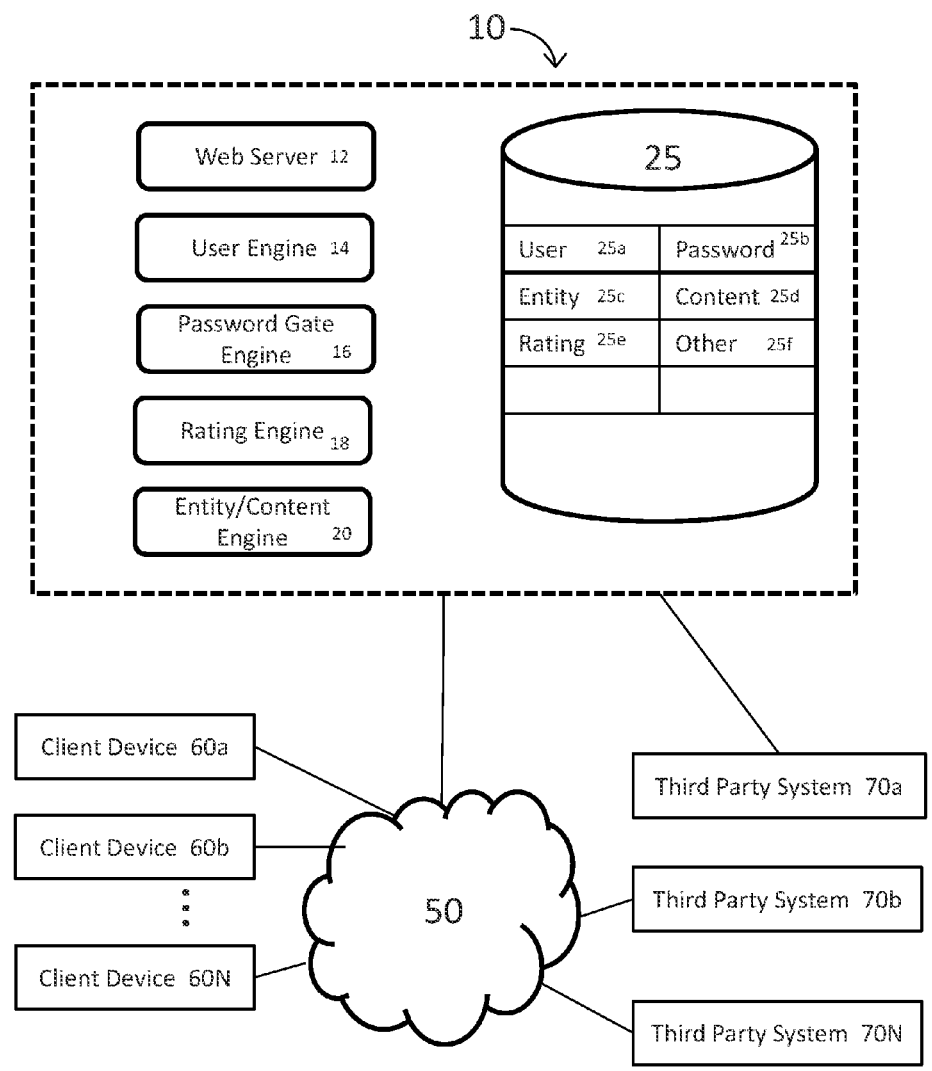
FIG. 1 is a schematic representation illustrating a ratings access system 10 operatively connected to one or more client devices and third party systems according to an exemplary embodiment of the present disclosure.

According to exemplary embodiments, FIG. 1, shows a ratings access system, generally designated by numeral 10. The ratings access system 10 may be operatively connected to one or more client devices 60a ... 60N associated with one or more users. The client devices may include devices such as, for example, a laptop, desktop, smartphone, Blackberry, iPhone, iPad, tablet device, iPod, Android device, and the like. The rating access system 10 may be operatively connected to one or more third parties systems 70a ... 70N. A third party system 70 may include one or more computer systems associated with one or more third parties, such as, for example, businesses, websites, organizations, individuals, content providers, and the like.

In exemplary embodiments, the ratings access system 10 may include one or more components, such as for example, server 12, user engine 14, password gate engine 16, ratings engine 18, entity engine, and database 25.

In exemplary embodiments, the ratings access system 10, and by extension, any one of its components, may be operatively connected to one or more computer networks 50, such as, for example, the Internet, or any other suitable network, via, by way of example, a set of routers and/or networking switches.

The components of the ratings access system 10 are shown to be located together in FIG. 1. It is to be understood that some in embodiments the components of ratings access system 10 may be combined or separated in any suitable manner. For example, one or more components may be located together on one or more computer systems that are operatively to other components of the ratings access system 10.

In exemplary embodiments, the ratings access system 10 may include one or more servers, referred herein as server 12. Server 12 may distribute and/or receive material over one or more networks, such as for example, web pages, media content, application data, and the like to one or more client devices 60 and/or third party systems 70.

In exemplary embodiments, one or more engines may be used by the ratings access system 10 to implement one or more computer processes. In exemplary embodiments, each engine can be stored separately or in combination with one or more other engines on processor readable storage devices, which are operatively connected to one or more processors on one or more computers to run the software embodied as part of the engine.

In exemplary embodiments, the ratings access system 10 may include user engine 14, which may implement processes relating to users, such as, for example, registering users, tracking users, updating user data, and the like.

In exemplary embodiments, the ratings access system 10 may include a password gate engine 16, which may implement processes relating to creating and implementing password gates.

In exemplary embodiments, the ratings access system 10 may include a ratings Engine 18, which may implement processes relating to implementing one or more rating systems with respect to password gates, businesses, content, and the like to name a few.

In exemplary embodiments, a user may vote for or against a particular password gate by submitting either +1 or −1 rating. The top or highest ranked password gate may be the password gate with the highest number of plus votes (+1) relative to minus votes (−1). For example, a first password gate that has 15 plusses and 10 minuses (+15/−10), i.e., a 60% positive rating, would be rated/ranked lower than a second password gate with 30 plusses and 10 minuses (30+/−10), i.e. a 75% positive rating. It can be appreciated that the disclosure is not limited to a ± rating system, and in accordance with the present disclosure other variants and/or other types of rating/ranking systems may be used, such as, for example, letter grades ratings, e.g. (A, B, C,), numeric ratings based on voters providing a number that falls within a pre-specified range, (a number from 1 to 10, a number from 1 to 100, etc.), to name a few.

In exemplary embodiments, the ratings access system 10 may include one or more databases, herein designated by numeral 25 to store one or more sets of data. The one or more sets of data may include, for example, user data 25a, password gate data 25b, entity data 25c, content data 25d, rating data 25e, and other data 25f stored on one or more computer storage readable media. In exemplary embodiments, other types of data and or other databases may be used in conjunction with the ratings access system 10. The one or more databases of database 25 may be located together or separately, with the one or more databases being operatively connected to one or more components of the ratings access system 10.

In exemplary embodiments, the user data 25a may include user information such as, for example, user name, password information, and insider/outsider status, to name a few. In some embodiments, user data may be stored and retrieved from cookies placed on users' computers and the like.

In exemplary embodiments, the password gate data 25b may include password gate information, such as for example, question information and answer information for entities associated with the ratings access system 10.

In exemplary embodiments, the entity data 25c may include information for each of the respective entities associated and/or registered with the ratings access system 10, such as, for example, entity identification, entity type, location, and other suitable or appropriate information related to the entity. In exemplary embodiments, the content data 25d may include information for each of the respective contents associated with the ratings access system 10, such as, for example, content identification, content type, content author/owner, and other suitable or appropriate information related to the content. The content data 25d may relate or be associated with an entity or may stand-alone.

In exemplary embodiments, the rating data 25e may include information for each of the respective entities associated with the ratings access system 10, such as, for example, votes/ratings, aggregated vote/rating totals, opinion information and the like. The rating data 25e may be associated with password gates, entities, contents, and the like.

In exemplary embodiments, the ratings access system 10 may publish user opinions and/or user ratings, for example, to a website, to social networks, or to client devices through an application located on the client device. The rating/opinion information may relate to one or more businesses/entities, such as, for example, a restaurant, hotel, bar, night club, and/or any other type of business and is not limited to such. There can be categories for ratings of a particular business or entity, such as for a restaurant the quality of management, service, food, décor, etc. of that particular restaurant. Several businesses and/or categories can exist for each type of business and the disclosure is not limited to any particular type of category or business. The ratings access system 10 may publish ratings from both an "outsider" user, who can be a patron who has visited and/or used the services of that particular business, and an "insider" user, who can be an employee, manager or agent of the particular business.

The rating access system 10 may provide one or more interfaces to interact with users, such as for example, a website and/or an application running on a client device. The ratings access system 10 may require users to register with the system 10 through any suitable means so as to provide information such as, for example, name, location, email, telephone, age, and the like. The system 10 may allow a user to register using a social network profile, for example a profile/account associated with Facebook, LinkedIn, Google+, to name a few.

Figure 2:
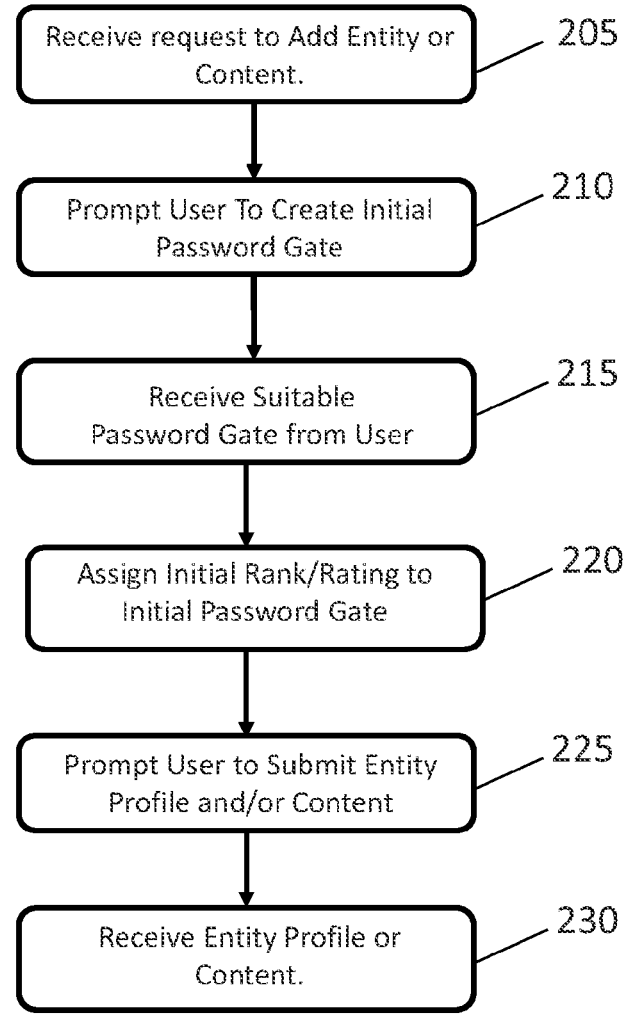
FIG. 2 is a flow chart illustrating an exemplary method for adding an entity and/or content using a ratings access system according to an exemplary embodiment of the present disclosure.

In exemplary embodiments, the rating access system 10 may allow users to add a particular entity or content to the ratings access system 10. Referring to FIG. 2, at step 205, a user, through a client device, may request to add an entity or content to the rating access system 10. The user may provide information, so as to identify the entity/content to the ratings system 10 through an interface implemented through an application and/or website. If the entity or content has not been previously added, then at step 210, the rating access system 10 may prompt the user to enter an initial password gate for the respective entity/content. In exemplary embodiments, a password gate may consist of a question and single-word answer is associated with the user submitted entity/content. It is to be appreciated that while in some embodiments the form of the password gate is described as a question with a single word answer, other variants or forms of password gates may exist and used in this disclosure. For example, in some embodiments, the answer need not be limited to a single word answer. In some exemplary embodiments, a password gate include a multiple-choice type question and answer. In some exemplary embodiments the password gate may include a plurality of question and answers.

At step 215, the ratings access system 10 may receive a suitable initial password gate and answer from the user via the interface. For example, FIG. 2A shows an exemplary interface that allows a user to provide a question and answer for a password gate.

Referring back to FIG. 2, at step 220, the ratings access system 10, via the ratings engine 18, may assign an initial rank/rating to the initial password gate. For example, the ratings access system 10 may automatically assign a +1/−0 (or 100% approval) vote/rating from the user to the initial password gate and update the database 25 with such information. The stored information may indicate that this user has already voted so as to prevent this same user from voting positively for this particular password gate again in the future. In some exemplary embodiments the ratings access system 10 may allow users to change their vote, e.g. from +1 to −1, or −1 to +1, at anytime or as often as is desired.

At step 225, the ratings access system 10, may prompt the user to submit a profile or additional information for the added entity or content. At step 230, the ratings access system 10 may receive additional profile and/or content information. In exemplary embodiments, the ratings system 10 may present an interface to the client device 60 so that information associated with the entity/content may be provided from the user for subsequent users to vote and/or comment on. For example, if the added entity is a restaurant, the user may add information regarding the location, menu, staff, and the like. In addition, a user may upload content and/or indicate to the ratings access system 10 where to acquire and/or retrieve related content from a third party system and/or network 70, such as a website, content media server, and the like. All such information retrieved by the ratings access system 10 may be stored in the database 25.

In exemplary embodiments, the ratings access system 10, may designate the user who added the content/access as an 'insider' with respect to the added entity/content. In some embodiments, an insider to a particular entity/comment may be exclusively allowed to at least vote/rate, comment, on one or more aspects of that particular entity/content. For example, in the case of the restaurant being the added entity to the ratings access system 10, an insider may vote and/or comment on the restaurant in an overall sense. In some embodiments, the user may vote and/or comment on a specific feature or aspect of the restaurant, such as, for example, a particular food item, décor, staff, and the like. The ratings access system 10 may provide an interface for allowing insider users to vote/comment.

In exemplary embodiments, a user-adder, or a user who adds an entity/content to the ratings system 10 may be affiliated with the entity. In some exemplary embodiments the ratings access system 10 may require a user adder to be affiliated. In some embodiments, an affiliated person may be an employee, an owner, or any other type of agent of an entity.

In some embodiments, the ratings access system 10 may consider affiliated persons as an insider and not require those users to answer a password gate question, at least initially. The ratings access system 10 may require such users to authenticate and provide suitable information to identify themselves and indicate their relationship to added entity/content.

In exemplary embodiments, only insiders can submit a new password gate question for particular entities. In some exemplary embodiments, all users can submit a password gate question for particular entities. The ratings access system 10 may track/monitor whether an insider or an outsider user submitted the new password gate question by updating the user and/or password gate information in the database 25. Accordingly, more than one password gate may be presented users. The ratings access system 10 may allow insiders, outsiders, and/or all users to vote on all or some of the particular password gate that exist, so as to allow the ratings access system 10 to generate rankings of the password gates.

Figure 3:
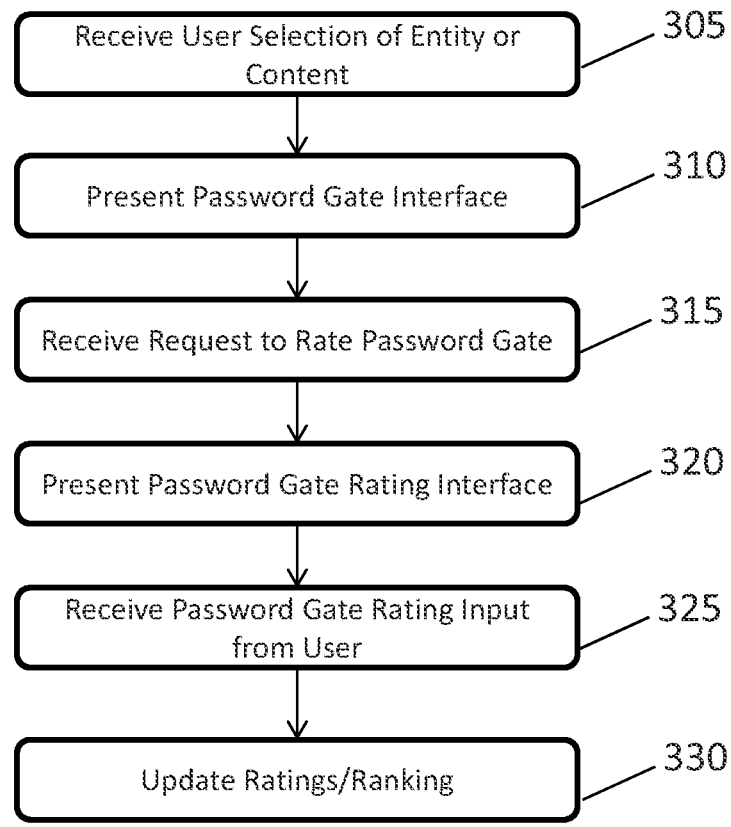
FIG. 3 is a flow chart illustrating an exemplary method for rating password gates using a ratings access system according to an exemplary embodiment of the present disclosure.

Referring to FIG. 3, a user may access the ratings access system 10 and select a particular entity or content, step 305. For example, the ratings access system 10 may present an interface to allow users using a client device 60, to view, search, and/or select one or more added/existing entities or content in the ratings access system 10.

At step 310, the ratings access system 10 may, in conjunction with at least the password gate engine 16, present a password gate interface to the user. At step 315, the user via a client device 60 may request to vote/rate password gates associated with the selected entity/content, or more specifically vote/rate the questions of the password gates. In some embodiments, the ratings access system 10 may require the user be identified as an insider with respect to the selected entity/content before allowing the user to vote/rate.

At step 320, the ratings access system 10 may provide a password gate rating interface to the user's client device 60. An exemplary password gate rating interface is shown in FIG. 3A. The password gate rating interface may allow a user to provide a +1 or −1 vote/rating for one or more password questions for the selected entity/content. As explained earlier, the rating systems of this disclosure are not limited to a ± rating system.

At step 325, the ratings access system 10 may receive from the user's client device 60 the password gate rating input. The ratings access system 10 may update the database with the additional rating information. At step 330, the ratings engine 18 may, for example, re-rank the password gates based on the additional rating information, and may update information in database to identify a new highest rank, or active, password gate.

Figure 4:
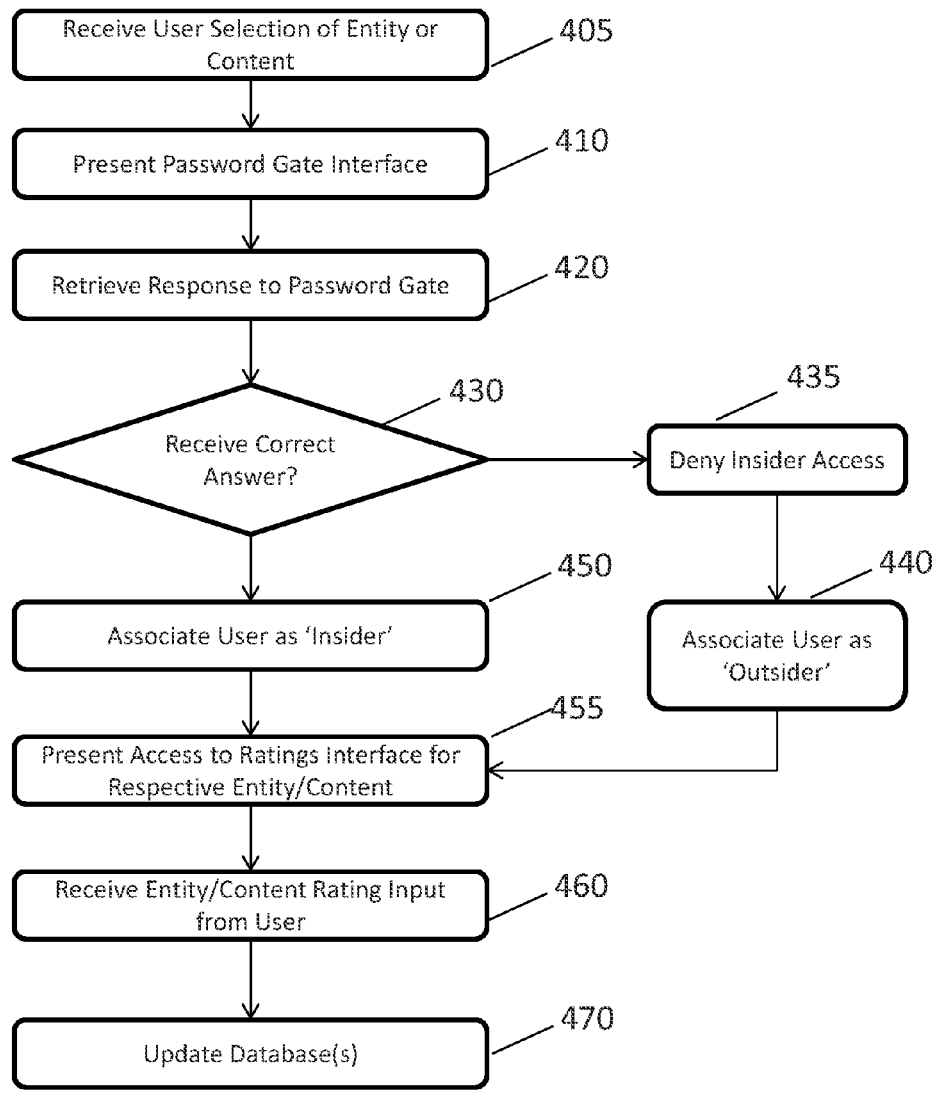
FIG. 4 is a flow chart illustrating an exemplary method for receiving access using an ratings access system 10 according to an exemplary embodiment of the present disclosure.

Exemplary embodiments can assure that users who are truly knowledgeable about the rated entity are the users providing ratings. Referring to FIG. 4, at step 405, a user via a client device 60, may select an entity/content of the ratings access system 10. At step 410, the ratings access system 10 may provide a password gate interface to the client device. In exemplary embodiments, if the user is not currently identified by the ratings access system 10 as an "insider" with respect to the selected entity or content, the password gate interface may present to the user the active or current highest rank password gate question(s).

In some embodiments, the ratings access system 10 may have to decide between two or more password gates with an equivalent or equal ranking/rating, e.g. a "tie". In such situations, the ratings access system 10 may select a password gate based on date where, e.g. the password gate created first and/or last gets selected. In some embodiments where there is a tie, the ratings access system 10 may decide on a password gate at random.

In some exemplary embodiments, the ratings access system 10 may not choose the highest ranked password gate, but may select the highest ranked password that meets a certain threshold, e.g., has at least a minimum number of votes. For example, if a first password gate associated with a particular entity has +1/−0 rating, it would be consider ranked "higher" than a second password gate with a +100/−10 rating. However, in such a situation the second password has had a much larger sample size, so second password gate rating may be considered more meaningful or relevant. Therefore, the ratings access system 10 may not consider the first password gate until at least a specified number of votes, such as, for example 10 votes, has been placed with respect to it. In some embodiments, where no password gates for a particular entity/content meet a specified threshold, then the ratings access system 10 may rely on the date the password gate was created, or may present each password gate at random until the threshold has been met.

In some embodiments, users who have been previously been identified as an insider with respect to a particular entity/content, may be provided access to an insider ratings interface without being required to answer a password gate. In some exemplary embodiments, all users may be presented with a password gate question regardless of their status.

At step 420, the user via the client device 60 may submit one or more answers to the password gate. At step 430, the ratings access system 10 determines whether the answer submitted by the user matches the correct information in the database 25. If the ratings access system 10 determines that received answer is incorrect, the user will not be given access to the insider ratings interface. In other embodiments, the user may be given one or more additional attempts or tries to get the answer correct. If the user is unable to provide the correct answer to the password gate question, then, at step 435 the user may be denied access to the interface as an insider. Such users who provide incorrect answers may be designated as an outsider with respect to the selected entity/content, at step 440.

If the user provided the correct answer(s) to the password gate, the ratings access system 10, at step 450 may update information in the database 25 so as to identify the user as an insider with respect to the selected entity/content.

Figure 4A:
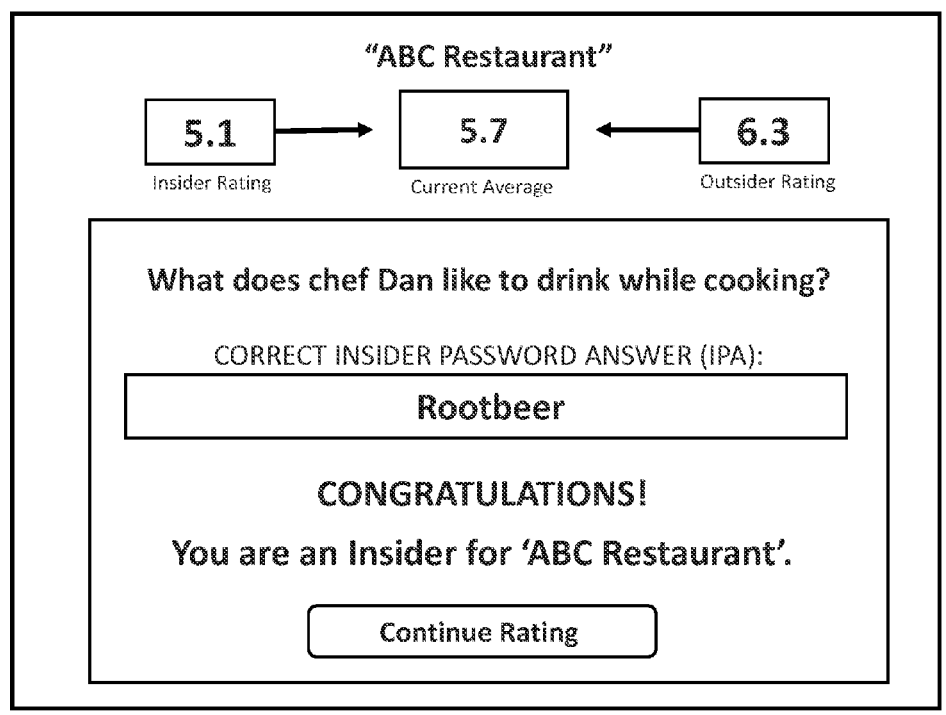
FIG. 4A is an exemplary interface for answering a password gate using a ratings access system according to an exemplary embodiment of the present disclosure.

FIG. 4A shows according to exemplary embodiments, a password gate rating interface after a user has submitted a correct answer to the question "What does chef Dan like to drink while cooking?" with respect to the entity "ABC Restaurant." Presumably, a user whom is familiar with "ABC Restaurant" would know the answer to such a question. At step 455, the user, now identified as an insider, may be given access to the ratings interface for the respective entity/content.

A user identified as an insider and/or an outsider may be presented with access to one or more ratings interface associated with the selected entity/content, at step 455. In some embodiments, the outsider interface may be the same or may be more limited than the insider rating interface. For example, an outsider user may not be allowed or able to vote on, comment on, or have access to all the content or of information of insider users.

At step, 460, the ratings access system 10, may receive rating and or comment information from user. For example from an insider or an outsider user, the rating access system 10 may receive ratings, comments, and other information regarding the selected entity/content. At step 470, the ratings access system 10, may update the database with the data received from the user so as can be published in any suitable way to other users. For example, referring back to FIG. 4A, the password gate interface shows an "Insider Rating", an "Outsider Rating" and an "Current Average" from both outsiders and insiders. It can be appreciated that ratings, comments, and the like can be published in various formats through any suitable means to device, websites, social networks, and the like.

In exemplary embodiments, the ratings access system 10 may contain and/or provide rules and/or guidelines as to what businesses can be added, so as to ensure a user is accurately submitting information, and to make sure the business is not listed more than once. All such rules and/or guidelines are contemplated by the disclosure and the disclosure is not limited to such.

Figure 5:
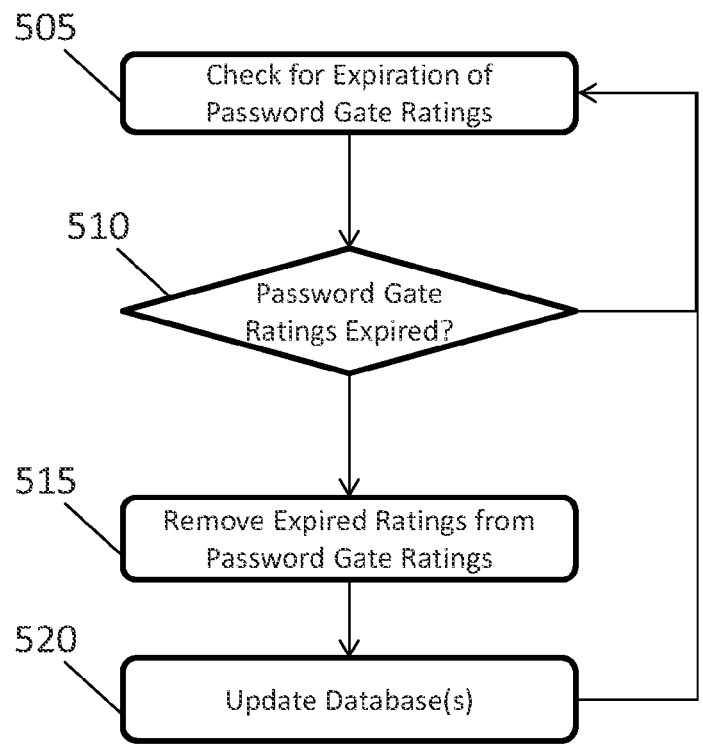
FIG. 5 is a flow chart illustrating an exemplary method for applying expiration dates in a ratings access system according to an exemplary embodiment of the present disclosure.

In exemplary embodiments, the ratings access system 10 may apply expiration dates to one or more items such as, for example, password gates, password gate ratings, entity/content profiles, entity/content ratings entity/content comments, and the like. In exemplary embodiments, the system 10 may check and update the data stored in the database 25 based on expiring items. For example, in FIG. 5, the ratings system 10, at step 505 may check the expiration status for the password gate ratings. In exemplary embodiments, the ratings access system 10, may record in database 25 the dates on which ratings and an associated expiration date. The ratings access system 10 may set the expiration date based on input from a user, or based on pre-defined expiration periods. For example, an expiration period may be a date that is one year from the date of creation. The expiration periods may be different for different items associated with the ratings access system 10. For example, password gate ratings may expire in a year, password gate questions may expire in two years, etc.

The ratings system 10 may check for the expiration status continuously and/or automatically through instructions from the ratings engine 18. In some embodiments the ratings engine 18 may poll the status of the ratings in repeated intervals. At step 510, the ratings system 10 determines whether or not any password gates are expired. If no ratings have expired, the ratings access system 10 may continue to check. If the ratings access system determines one or more ratings have expired, then at step 515, then the ratings access system 10 will adjust the total vote/rating for the password gate associated with the expired ratings. Further, the ratings access system 10 may readjust the rankings of the password gates accordingly. For example, FIG. 5A shows representative rankings of password gates, or more specifically the questions of the different password gates, before and after some ratings have expired.

In exemplary embodiments, the ratings access system 10 may allow anyone to vote and/or provide comments as an outsider and can publish those ratings and comments for any user of the website to review.

For example, if a majority of insiders and/or users vote a particular password gate question to be the most popular for that particular section of content for the business, it can be the active question and answer password gate for that section of content. In exemplary embodiments, when a user wants to voice their opinion and/or provide comments for a business as an insider, only users who know the correct answer to that particular password gate question will be granted access as an insider, and permitted to voice opinions or rate categories pertaining to that restaurant or business as an insider. In exemplary embodiments, active question and answer password gates can be created and selected by users themselves, and not the website and/or network system. Further, in exemplary embodiments, the website can be overseen and/or managed by an administrator.

In exemplary embodiments, the ratings access system 10 may allow users to not only vote on password gates, but also object to a particular password gate, such as an active password gate. For example, users may find a particular password gate as inappropriate because of suspect vote rigging or collusion. Instead of users down voting, e.g. submitting a −1 vote, which may not change the rank of a gate, users may submit an objection. For example, at a password gate interface, there may be provide an "objection" option. In some embodiments the objection option may be implemented as a clickable button that sends an objection message to the ratings access system 10. In other embodiments, the objection option may include the ability for a user to provide comments, such as why the user is objecting to a particular password gate. The ratings access system 10 automatically disable or delete a password gate if the number of objections exceeds a threshold. For example a threshold may be based on a number of objections, a certain number or percentage of objections relative to the current number of votes for a particular password gate, and the like. In some embodiments, if the threshold is met the ratings access system 10 may notify an administrator associated with the ratings access system 10. The administrator associated with ratings access system 10 may review the objections and/or the password gate in question and decide a proper course of action, e.g. disable, delete, or may take no action.

The website and/or other networked system can apply a question and answer password election to any area of content for a particular business, such as food, décor, management, service, cleanliness, etc., and is not limited to any particular area of content. Question and answer password gates can be applied to entire sections of content (e.g., all the content pertaining to an individual restaurant or business), or to individual areas of a given section of content (e.g. the "management" of a restaurant or business).

In exemplary embodiments, as users submit additional question and answer password gates for an area of content, or only for the particular business or entity, the highest-rated and therefore active password gate can change any number of times, which can allow a new group of insiders to affect the content while restricting previous insiders who are no longer able to answer the new top-rated password gate question. In exemplary embodiments, this can allow the most current and active group of insiders to control access to affecting the particular ratings of the section of content for a particular business.

In exemplary embodiments, a website and/or network system can apply a question and answer password election to any particular area of content for a particular business. Users can create a simple one sentence question, which can have a word limit, and simple answer gates, such as one or two word answers, but the disclosure is not limited to such and multiple questions and answers are also contemplated by the disclosure. Once at least one question and answer gate is created by a user, no users other than those who can correctly answer that active password gate question can affect that particular content for which access is desired.

It will be understood that that any of the above steps and/or elements can be combined, separated, any combination and/or separation thereof, and/or taken in any order. For ease, the steps are described as being sequential and/or in order. This is merely for ease and is not in any way meant to be a limitation.

Now that exemplary embodiments of the present disclosure have been shown and described in detail, various modifications and improvements thereon will become readily apparent to those skilled in the art.

What is claimed is:

1. A method for providing access comprising:
   (a) accessing one or more electronic databases stored on one or more non-transitory computer-readable storage media operatively connected to one or more computers, the databases comprising:
      (i) entity information identifying one or more entities,
      (ii) password gate information associated with at least one of the entities, comprising one or more password gates, answers to the one or more password gates being information regarding the one or more entities,
      (iii) user information associated with one or more users,
      (iv) rating information comprising ratings for one or more password gates for respective entities;
   (b) receiving, via a communication network, at the one or more computers from one or more client devices associated with the one or more users, one or more proposed password gates associated with a first entity, and one or more answers to the proposed password gates being information regarding the first entity;
   (c) receiving, via the communication network, at the one or more computers from the one or more client devices associated with the one or more users, rating information associated with each of the one or more proposed password gates;
   (d) updating, using the one or more computers, the password gate information and the rating information of the one or more databases based on the received one or more proposed password gates and the received rating information;
   (e) receiving, via the communication network, at the one more computers, a request from a client device to access the first entity;
   (f) accessing, at the one or more databases by the one or more computers, entity information associated with the first entity, the updated password gate information associated with the first entity, and the updated password gate rating information associated with the one or more password gates for the first entity;
   (g) assigning, by the one or more computers, a highest rated password gate based on the accessed updated password gate rating information as a password gate for the first entity, and an answer to the password gate being information regarding the first entity;
   (h) transmitting, via the communication network, by the one or more third party service computers, the password gate to the client device;
   (i) receiving, via the communication network, at the one or more computers, answer information associated with the password gate from the client device;
   (j) determining, at the one or more computers, whether the answer information answers the password gate; and
   (k) providing, via the communication network, to the client device, by the one or more computers, access to a first ratings interface for the first entity if the answer information answers the password gate.

2. The method of claim 1, further comprising,
   (l) assigning, by the one or more computers, a status to a user of the client device based at least on part of step (j), and storing the status in the one or more databases as part of the user information.

3. The method of claim 2, further comprising assigning an insider status to the user if the answer information answers the password gate.

4. The method of claim 2, further comprising assigning an outsider status to the user if the answer information does not answer the password gate.

5. The method of claim 4, further comprising providing, to the client device, by the one or more computers, access to a second ratings interface.

6. The method of claim 1, wherein the assigned password gate comprises one question.

7. The method of claim 1, wherein the assigned password gate comprises a plurality of questions.

8. The method of claim 1, wherein the answer to a password gate comprises a single word.

9. The method of claim 1, wherein password gate rating information associated comprises at least information indicating a total number of plus votes and a total number of minus votes.

10. The method of claim 9, wherein the step (g) of assigning a password gate comprises selecting the password gate associated with the highest total number of plus votes relative to total number of minus votes.

11. The method of claim 1, further comprising,
    (l) assigning, by the one or more computers, an initial rating to the one or more proposed password gates on behalf of the one or more users; and
    (m) updating the one or more databases using the one or more computers, the password gate information and rating information based on the proposed password gate and the assigned initial rating.

12. The method of claim 1, further comprising,
    (l) receiving, at the one or more computers from the client device, rating information associated with the first entity;
    (m) updating the one or more databases based on the received rating information associated with the first entity; and
    (n) publishing to one or more destinations by the one or more computers, updated rating information.

13. The method of claim 12, wherein at least one destination is a website.

14. A method for providing access to a computer system comprising:
    (a) accessing one or more electronic databases stored on one or more non-transitory computer-readable storage media operatively connected to one or more computers, the databases comprising:
       (i) entity information identifying one or more entities,
       (ii) password gate information associated with at least one of the entities, comprising one or more password gates, answers to the one or more password gates being information regarding the at least one of the entities;
       (iii) user information associated with one or more users of the computer system;
       (iv) rating information comprising ratings for one or more password gates for respective entities;
    (b) receiving, via a communication network, at the one or more computers from one or more client devices associated with the one or more users, one or more proposed password gates associated with a first entity, and one or more answers to the proposed password gates being information regarding the first entity;
    (c) receiving, via the communication network, at the one or more computers from the one or more client devices associated with the one or more users, rating information associated with each of the one or more proposed password gates;
    (d) updating, using the one or more computers, the password gate information and the rating information of the one or more databases based on the received one or more proposed password gates and the received rating information;

(e) receiving, at the one more computers, a request from a client device associated with a user to rate one or more password gates associated with a first entity (f) accessing, at the one or more databases by the one or more computers, entity information associated with the first entity, the updated password gate information associated with the first entity, and the updated rating information associated with the one or more password gates for the first entity;

(g) assigning, by the one or more computers, a highest rated password gate based on the accessed updated password gate rating information as a password gate for the first entity, an answer to the password gate being information regarding the first entity;

(h) providing to the client device, a password gate rating interface displaying at least one or more password gate questions, answers to the one or more password gate questions being information regarding the first entity.

\* \* \* \* \*